United States Patent [19]

Seita et al.

[11] Patent Number: 4,693,796

[45] Date of Patent: Sep. 15, 1987

[54] METHOD FOR MANUFACTURING CATION EXCHANGE MEMBRANE

[75] Inventors: Toru Seita; Takao Satoh; Mitsuo Kikuchi, all of Shinnanyo, Japan

[73] Assignee: Toyo Soda Manufacturing Co., Ltd., Yamaguchi, Japan

[21] Appl. No.: 792,629

[22] Filed: Oct. 25, 1985

Related U.S. Application Data

[63] Continuation of Ser. No. 586,892, Mar. 12, 1984, abandoned, which is a continuation of Ser. No. 316,049, Oct. 28, 1981, abandoned.

[30] Foreign Application Priority Data

Nov. 5, 1980 [JP] Japan .................. 55-154630
Nov. 7, 1980 [JP] Japan .................. 55-155762

[51] Int. Cl.[4] .................. C25B 1/14; C25B 1/00; C25B 13/00; C08D 5/20
[52] U.S. Cl. .................. 204/98; 204/128; 204/252; 204/296; 521/27; 521/28
[58] Field of Search .................. 521/27, 28; 204/98, 204/128, 252, 296

[56] References Cited

U.S. PATENT DOCUMENTS

| | | | |
|---|---|---|---|
| 4,126,589 | 11/1978 | Hamada et al. .................. | 521/31 |
| 4,147,599 | 4/1979 | O'Leary et al. .................. | 204/87 |
| 4,151,053 | 4/1979 | Seko et al. .................. | 204/98 |
| 4,165,248 | 8/1979 | Darlington et al. .................. | 204/296 |
| 4,176,215 | 11/1979 | Molnor .................. | 521/27 |
| 4,224,121 | 9/1980 | Dempsey et al. .................. | 204/98 |

FOREIGN PATENT DOCUMENTS 1484612  9/1977  United Kingdom .
1518387  7/1978  United Kingdom .

*Primary Examiner*—Peter F. Kulkosky
*Attorney, Agent, or Firm*—Armstrong, Nikaido, Marmelstein & Kubovcik

[57] ABSTRACT

A cation exchange membrane manufacturing method in which a film of a blend which consists of a perfluoro carbon polymer having a group transformable into a sulfonic acid group and a perfluoro carbon polymer having a group transformable into a carboxylic acid group or a film of a copolymer which consists of a perfluoro carbon monomer having a group transformable into a sulfonic acid group and a perfluoro carbon monomer having a group transformable into a carboxylic acid group and another film of a perfluoro carbon polymer having a group transformable into a carboxylic acid group are joined together. Following that, the group transformable into a carboxylic acid group and the group transformable into a sulfonic acid group are transformed respectively into the carboxylic acid group and the sulfonic acid group.

2 Claims, No Drawings

METHOD FOR MANUFACTURING CATION EXCHANGE MEMBRANE

This application is a continuation of application Ser. No. 586,892, filed Mar. 12, 1984 which is a Rule 62 continuation of U.S. Ser. No. 316,049 filed Oct. 28, 1981, both now abandoned.

DETAILED DESCRIPTION OF THE INVENTION

This invention relates to a novel method for obtaining a cation exchange membrane and more particularly to a cation exchange membrane manufacturing method wherein a film of a perfluoro carbon polymer having both a group transformable into a carboxylic acid group and a group transformable into a sulfonic acid group in the state of a blend or in the state of a copolymer, and a film of a perfluoro carbon polymer which has a group transformable into a carboxylic acid group are superposed each other and joined together; and then the group transformable into a carboxylic acid group and the group transformable into a sulfonic acid group are transformed respectively into the carboxylic acid group and the sulfonic acid group.

There have appeared, as electrolytic diaphragm for alkali metal halides, some cation exchange membranes that have a sulfonic acid group as exchange group and uses a perfluoro carbon polymer as substrum. A typical example of such cation exchange memberanes is a sulfonic acid type membrane which is made of a perfluoro carbon polymer and is marketed by the DuPont Co.

While this membrane presents no problem in durability, it is hardly satisfactory in terms of the cation transport number.

Hence, various methods have been studied and are still being studied, including:

(1) A method in which the concentration of the exchange group on one side of such a membrane facing a cathode chamber is arranged to be lower than that of the other side facing the anode chamber.

(2) A method in which the exchange group on the side facing the cathode chamber is arranged to be more weakly acidic than that of the other side facing the anode chamber.

(3) Another method in which a weakly acidic exchange group is employed.

It is well known that the cost of production is generally not only dependent on power consumption but also greatly dependent on the rate of decomposition of the alkali metal halide used and the concentration of the alkali hydroxide produced. Further, if the purity of an alkali hydroxide produced is low, even a manufacturing method that produces the alkali hydroxide at a low production cost would hardly be acceptable for industrial purposes.

To have an industrial operation efficiently carried out, the balance between these points must be thoroughly taken into consideration in developing a suitable membrance.

In carrying out electrolysis for obtaining a high concentration alkali metal hydroxide with the above stated improved cation exchange memberane of the prior art used for enhancing the rate of decomposition of an alkali metal halide, it has often been experienced that not only current efficiency lowers but also the alkali metal halide mixes in the alkali metal hydroxide thus obtained.

The present invention has resulted from studies which have been strenuously conducted for the solution of the above stated problems of the prior art.

It is therefore a general object of the invention to provide a cation exchange membrane manufacturing method wherein a film of a perfluoro carbon polymer having both a group transformable into a sulfonic acid group and a group transformable into a carboxylic acid group in the same molecule of the polymer thereof (i.e. a film of copolymer consisting of a perfluoro carbon monomer having a group transformable into a sulfonic acid group and a perfluoro carbon monomer having a group transformable into a carboxylic acid) or a film of a blend consisting of a perfluoro carbon polymer having a group transformable into a sulfonic acid group and a perfluoro carbon polymer having a group transformable into a carboxylic acid group and another film of a perfluoro carbon polymer having a group transformable into a carboxylic acid group are joined together and then the groups concerned are transformed into a sulfonic acid group and a carboxylic acid group respectively.

The exact reason why the invented method gives excellent results is not clearly known. However, it may be explained in the following manner:

Swelling of the membrane surface on the side of the anode chamber increases according as the rate of decomposition of the alkali metal halide of the anode chamber becomes higher. This causes the aqueous solution of the alkali metal halide to enter the membrane to increase the water content in the membrane. Then, the increased water content lowers the concentration of fixed ion to lower the current efficiency. This in turn causes the alkali metal halide within the membrane to move to the cathode chamber to lower the purity of the alkali metal hydroxide produced.

In cases where the surface of the membrane facing the cathode chamber is arranged to swell to an extremely less degree, the difference in swelling between the two surfaces of the membrane becomes greater and would eventually come to break the membrane. In view of this, the degree of swelling of the membrane surface on the side of the anode chamber must be lowered. Further, arrangement to increase the rate of decomposition of the alkali metal halide in the anode chamber tends to lower the concentration of the alkali metal halide. On the other hand, if the concentration of the alkali hydroxide produced by the cathode chamber is arranged to increase, the swelling of the membrane surface on the side of the anode chamber swells more than swelling of the other surface of the membrane on the side of the cathode chamber. This tendency brings forth the above stated undersirable results.

In accordance with the cation exchange membrane manufacturing method of the invention, the fluoro carbon polymer may be composed of a monomer expressed by the following generic formula:

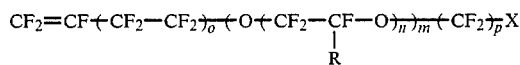

wherein
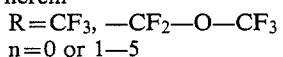
n=0 or 1—5 m=0 or 1
o=0 or 1
p=1-6
X=SO₂F, SO₂Cl, COOR₁ (R₁=1 to 5 alkyl groups), CN, COF

A polymer which is polymerized by adding a second and/or third monomer component to the above stated monomer component expressed by the Formula may be used. More specifically, the polymer may be selected from the following groups of polymers:

GROUP A

Examples of perfluoro carbon polymers having a group which is transformable into a sulfonic acid group:

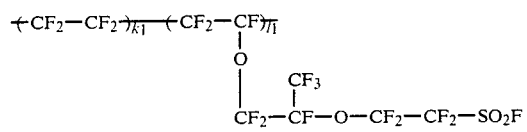
(1)

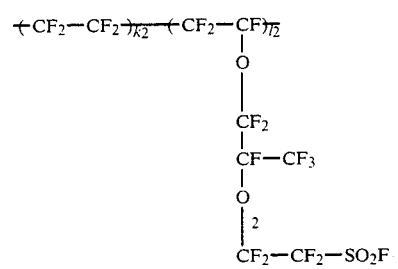
(2)

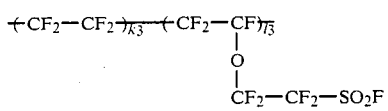
(3)

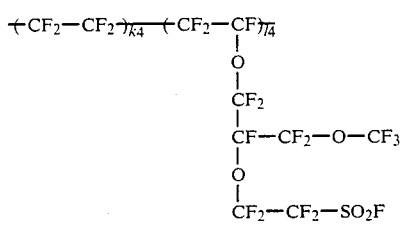
(4)

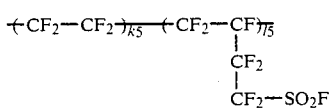
(5)

EXAMPLE B

Examples of perfluoro carbon polymers having a group which is transformable into a carboxylic acid group:

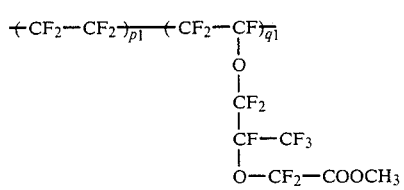
(1)

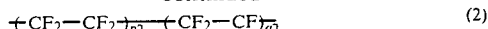
-continued
(2)

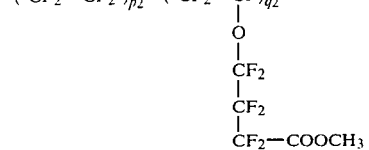
(3)

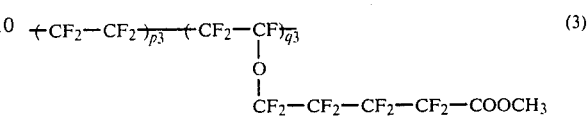
(4)

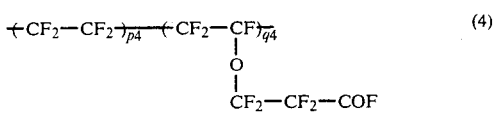
(5)

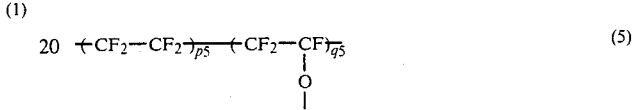
(6)

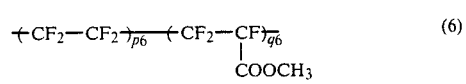
(7)

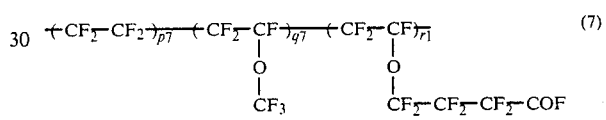
(8)

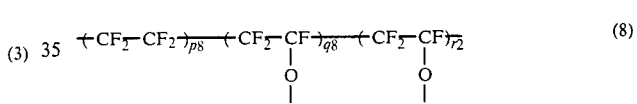
(9)

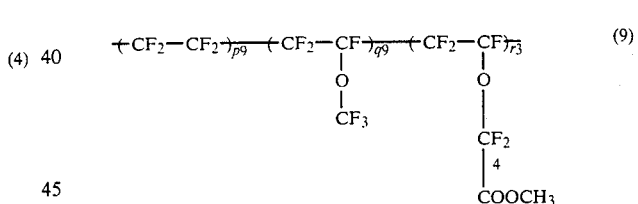
(10)

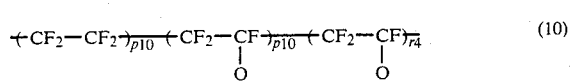
(11)

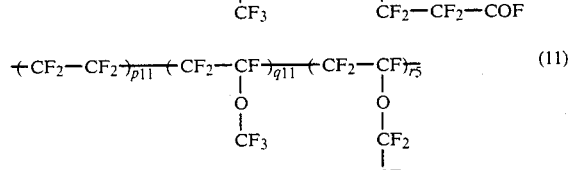
(12)

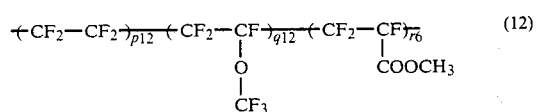

GROUP C

Examples of perfluoro carbon polymers simultaneously having a group transformable into a sulfonic acid group and a group transformable into a carboxylic acid group:

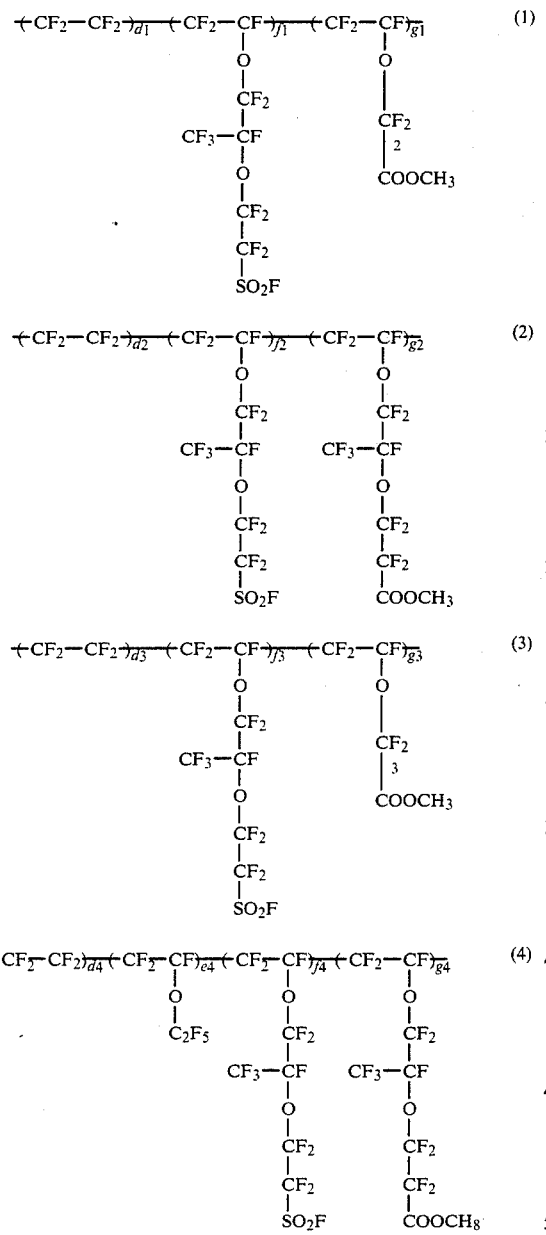

Among the perfluoro carbon polymers included in Groups A and B, the usable polymers have the exchange capacity of the group which is tranformable into a sulfonic acid group between 0.5 and 1.0 meq/g as sulfonic acid group and that of the group which is transformable into a carboxylic acid group between 0.8 and 1.5 meq/g as carboxylic acid group respectively.

In blending a perfluoro carbon polymer (Group A) having the group transformable into the sulfonic acid group with a perfluoro carbon polymer (Group B) having the group transformable into the carboxylic acid group, they are blended in the ratio by weight between 0.5 and 20.

In accordance with the invention, in the perfluoro carbon polymers included in Group C, the usable exchange capacity of the group which is transformable into a carboxylic acid group and that of the group which is transformable into a sulfonic acid group is between 0.5 and 1.2 meq/g as carboxylic acid group and as sulfonic acid group.

In the polymer of Group B to be used in combination with Group C, the usable range of exchange capacity, as carboxylic acid group, of the group transformable into the carboxylic acid group is between 0.8 and 1.5 meq/g.

When polymerization is to be carried out, it is carried out under the action of a polymerization initiator such as a peroxy compound, an azo compound, ultraviolet rays, etc. with or without an inert organic solvent or water solvent in accordance with a known method.

From the above stated polymers, films can be formed by one of known methods, such as press forming, roll forming, extrusion forming, dispersion forming, powder forming, etc. The forming temperature is 150° to 300° C. and preferably 160° to 250° C. The films are joined together by a press or roll method, etc. at a temperature within the range of 150° to 300° C.

The thickness of a layer which contains a carboxylic acid group is normally between 0.01 and 80% of the total thickness and preferably between 0.1 and 50%. The thickness of the membranous matter obtained ranges from 4 to 12 mil. Reinforcing fiber may be introduced into the membrane for improvement in the mechanical strength thereof. Further, the groups transformable into carboxylic acid groups and into suflonic acid groups within these polymers can be transformed into carboxylic acid groups and sulfonic acid groups by hydrolysis.

The above and further objects and features of the invention will become apparent from the following detailed description of embodiment examples thereof. It is to be understood, however, that these examples are intended to illustrate the invention and are not to be construde to limit the scope of the invention.

EXAMPLE 1

A ternary copolymer was obtained by polymerizing

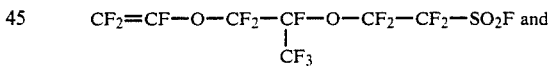

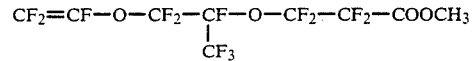

in 1,1,2-trichloro-1,2,2-trifluoro ethane with perfluoro propionyl peroxide used as initiator. The exchange capacity, as sufonic acid group and as carboxylic acid group, of a group transformable into a sulfonic acid group and a group transformable into a carboxylic acid group within the ternary copolymer thus obtained was 0.9 meq/g. The ratio of exchange capacity as sulfonic acid group and carboxylic acid group was 5:1. Hereinafter the polymer will be called the polymer A.

Another copolymer was obtained in the same manner from

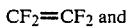

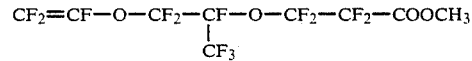

(The exchange capacity as carboxylic acid group was 1.1 meq/g.) Hereinafter this copolymer will be called the polymer B.

The polymers A and B were press formed at 210° C. into films of 5 mil and 2 mil respectively. These films were joined together with heat and pressure into one sheet of membrane. A cation exchange membrane was obtained by subjecting this to hydrolysis which was carried out with methanol/10 wt % of caustic soda (in the ratio by weight of 1/1).

An electrolytic cell having an effective area of $30\times30$ cm$^2$ was prepared with the cation exchange membrane used as diaphragm separating an anode chamber and a cathode chamber from each other. Saturated brine was supplied to the anode chamber to have exit concentration of 180 g/l while water is supplied to the cathode chamber to have exit caustic soda concentration of 32 wt %. Then, electrolysis was carried out at a current density of 30 A/dm$^2$ and at a temperature of 85° C.

Under a stable operating condition, current efficiency, voltage and sodium chloride concentration in the aqueous solution of caustic soda were as shown in Table 1.

TABLE 1

| Current efficiency (%) | Voltage (V) | Sodium chloride in the aqueous solution of caustic soda (ppm) |
| --- | --- | --- |
| 96 | 3.9 | 8 |

COMPARISON EXAMPLE 1

Polymerization of $CF_2=CF_2$ and

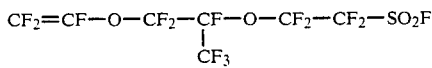

was carried out in the same manner as in Example 1 to obtain a copolymer (hereinafter will be called the polymer C) having an exchange capacity of 0.9 meq/g as sulfonic acid group. The copolymer was formed into a film of 5 mil in the same manner as in Example 1.

Following this, the film of the polymer B which had an exchange capacity as acid group of 1.1 meq/g and measured 2 mil in film thickness and that of the polymer C which had an exchange capacity as acid group of 0.9 meq/g and measured 5 mil in film thickness were joined together with heat and pressure into one membrane. Then, the membrane thus obtained was subjected to hydrolysis which was carried out with methanol/10 wt % of caustic soda (in the ratio by weight of 1/1) to obtain a cation exchange membrane.

Using this cation exchange membrane, electrolysis was carried out in the same manner as in Example 1 to obtain results as shown in Table 2.

TABLE 2

| Current efficiency (%) | Voltage (V) | Sodium chloride in the aqueous solution of caustic soda (ppm) |
| --- | --- | --- |
| 90 | 3.8 | 57 |

EXAMPLE 2

A copolymer was obtained by polymerizing the monomers of $CF_2=CF_2$ and

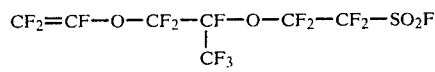

in 1,1,2-trichloro-1,2,2-trifluoro ethane with perfluoro propionyl peroxide used as initiator. The exchange capacity of the polymer as sulfonic acid group was 0.9 meq/g. Hereinafter the polymer will be called the polymer D. Another copolymer was obtained by polymerizing $CF_2=CF_2$ and

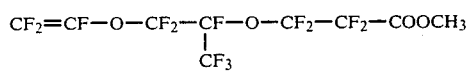

in the same manner. The copolymer thus obtained had an exchange capacity of 1.1 meq/g as carboxylic acid group. The copolymer hereinafter will be called the polymer E.

Next, the polymers D and E were blended with each other in the ratio by weight of 4:1 to obtain a blended polymer, which hereinafter will be called the polymer F. The polymer F was formed into a film measuring 4 mil in thickness.

Meanwhile, the copolymer of the polymer E was formed into a film measuring 3 mil in thickness. After that, the films thus obtained from the polymers F and E were joined together with heat and pressure into one film and then hydrolyzed with methanol/10 wt % of caustic soda (in the ratio by wt 1/1) to obtain a cation exchange membrane.

An electrolytic cell of an effective area $30\times30$ cm$^3$ was prepared by using the cation exchange membrane as diaphragm separating an anode chamber and a cathode chamber from each other with a carboxylic acid layer arranged to face the cathode chamber. Saturated brine was supplied to the anode chamber to have an exit concentration of 180 g/l while water was supplied to the cathode chamber to have an exit caustic soda concentration of 32 wt %. Then, electrolysis was carried out at a current density of 30 A/dm$^2$ and at a temperature of 85° C.

Under a stable operation condition, current efficiency, voltage and sodium chloride concentration in the aqueous solution of caustic soda were as shown in Table 3.

TABLE 3

| Current efficiency (%) | Voltage (V) | Sodium chloride in the aqueous solution of caustic soda (ppm) |
| --- | --- | --- |
| 96 | 3.8 | 12 |

COMPARISON EXAMPLE 2

A film of thickness 4 mil obtained from the polymer D and a film of thickness 3 mil obtained from the polymer E were joined with each other with heat and pressure into one film. After that the film thus obtained was subjected to hydrolysis which was carried out with methanol/10 wt % of caustic soda (ratio by wt 1/1) to obtain a cation exchange membrane.

Using the membrane thus obtained, an operation was carried out under the same operationg conditions as in Example 2 to obtain results as shown in Table 4.

TABLE 4

| Current efficiency (%) | Voltage (V) | Sodium chloride in the aqueous solution of caustic soda (ppm) |
|---|---|---|
| 93 | 3.8 | 58 |

COMPARISON EXAMPLE 3

A film of 7 mil obtained from the polymer E was hydrolyzed in the same manner as in Example 1. After that, an operation was carried out under the same operating conditions as in Example 2 to obtain results as shown in Table 5.

TABLE 5

| Current efficiency (%) | Voltage (V) | Sodium chloride in the aqueous solution of caustic soda (ppm) |
|---|---|---|
| 95 | 4.2 | 10 |

EXAMPLE 3

A ternary copolymer (having an exchange capacity of 1.4 meq/g as carboxylic acid group) was obtained by polymerizing $CF_2=CF_2$, $CF_2=CF-O-CF_2-CF_3$ and

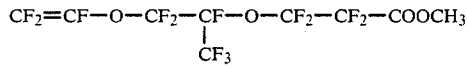

in 1,1,2-trichloro-1,2,2-trifluoro ethane with perfluoro propionyl peroxide used as initiator. The copolymer thus obtained hereinafter will be called the polymer G.

The polymer D and G were blended in the ratio by weight of 5:1 to obtain a polymer, which hereinafter will be called the polymer H. The polymer H was formed into a film measuring 4 mil in thickness. Meanwhile, a film measuring 3 mil in thickness was prepared from the polymer G (the ternary copolymer).

Next, the film obtained from the polymer H and the film obtained from the polymer G were joined with heat and pressure into a film. Then, the joined film was hydrolyzed with methanol/10 wt % of caustic soda (in the ratio by weight of 1/1) to obtain a cation exchange membrane.

An electrolytic cell of effective area of 30×30 cm² was prepared by using the cation exchange membrane obtained in the above stated manner as diaphragm separating an anode chamber and a cathode chamber from each other with the carboxylic acid layer of the cation exchange membrane arranged to face the cathode chamber. Saturated brine was supplied to the anode chamber to have exit concentration at 180 g/l and water was supplied to the cathode chamber to have exit sodium chloride concentration at 38 wt %. Then, electrolysis was carried out at a current density of 30 A/dm² and at a temperature of 85° C. Under a stable operating condition, the current efficiency, voltage and sodium chloride concentration in the aqueous solution of caustic soda were as shown in Table 6.

TABLE 6

| Current efficiency (%) | Voltage (V) | Sodium chloride in the aqueous solution of caustic soda (ppm) |
|---|---|---|
| 95 | 3.8 | 18 |

COMPARISON EXAMPLE 4

A film of 4 mil obtained from the polymer D and a film of 3 mil obtained from the polymer G were joined together with heat and pressure into one film. The film was then hydrolyzed with methanol/10 wt % of caustic soda (in the ratio by weight of 1/1) to obtain thereby a cation exchange membrane.

Using the membrane, an operation was carried out under the same operating conditions as in Example 3 to obtain results as shown in Table 7 below:

TABLE 7

| Current efficiency (%) | Voltage (V) | Sodium chloride in the aqueous solution of caustic soda (ppm) |
|---|---|---|
| 92 | 3.9 | 49 |

COMPARISON EXAMPLE 5

A film of 7 mil obtained from the polymer G was hydrolyzed in the same manner as in Example 1. After that, an operation was carried out under the same conditions as in Example 3 to obtain results as shown in Table 8 below:

TABLE 8

| Current efficiency (%) | Voltage (V) | Sodium chloride in the aqueous solution of caustic soda (ppm) |
|---|---|---|
| 95 | 4.2 | 14 |

What is claimed is:

1. In an electrolytic cell, the improvement consisting essentially of a cation exchange membrane means for substantially reducing alkali metal salt, said cation exchange membrane means being a cation exchange membrane prepared by providing two layers, a first layer being a film of a homogeneous blend consisting of a perfluoro carbon polymer having groups transformable into sulfonic acid groups within a range of 0.5 to 1.0 meq/g and a perfluoro carbon polymer having groups transformable into carboxylic acid groups, within a range of 0.8 to 1.5 meq/g, the blend being in a ratio by weight of 0.5 to 20, and a second layer being a film of a perfluoro carbon polymer only having groups transformable into carboxylic acid groups within a range of 0.8 to 1.5 meq/g, said films being joined together; and then transforming said groups transformable into carboxylic acid groups and said groups transformable into sulfonic acid groups respectively into carboxylic acid groups and sulfonic acid groups, wherein said two layers are discontinuous from each other, and said first layer of said film having both the carboxylic acid and sulfonic acid groups faces the anode.

2. In a chloralkali electrolytic process, the improvement consisting essentially of using a cation exchange membrane prepared by providing two layers, a first layer being a film of a homogeneous blend consisting of a perfluoro carbon polymer having groups transformable into sulfonic acid groups within the range of 0.5 to 1.0 meq/g and a perfluoro carbon polymer having groups transformable into carboxylic acid groups, within the range of 0.8 to 1.5 meq/g, the blend being in a ratio of 0.5 to 20, and a second layer being a film of a perfluoro carbon polymer having only groups transformable into carboxylic acid groups within the range of 0.8 to 1.5 meq/g, said films being joined together; and then transforming said groups transformable into carboxylic acid groups and said groups transformable into sulfonic acid groups respectively into carboxylic acid groups and sulfonic acid groups, wherein said two layers are discontinuous, and said first layer of said film having both said carboxylic acid groups and said sulfonic acid groups faces the anode, whereby an amount of alkali metal salt impurity in resulting alkali metal hydroxide product is substantially reduced.

* * * * *